US009235914B2

(12) United States Patent
Kawaguchi

(10) Patent No.: US 9,235,914 B2
(45) Date of Patent: Jan. 12, 2016

(54) IMAGE EDITING APPARATUS

(71) Applicant: Panasonic Corporation, Osaka (JP)

(72) Inventor: Yoshifumi Kawaguchi, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 103 days.

(21) Appl. No.: 13/949,545

(22) Filed: Jul. 24, 2013

(65) Prior Publication Data
US 2014/0029804 A1 Jan. 30, 2014

(30) Foreign Application Priority Data

Jul. 25, 2012 (JP) ................................. 2012-164322

(51) Int. Cl.
*G06K 9/20* (2006.01)
*G06T 11/60* (2006.01)
(52) U.S. Cl.
CPC ...................................... *G06T 11/60* (2013.01)
(58) Field of Classification Search
None
See application file for complete search history.

(56) References Cited

U.S. PATENT DOCUMENTS

| 2003/0108240 A1* | 6/2003 | Gutta et al. .................... 382/181 |
| 2006/0158527 A1* | 7/2006 | Kang et al. ............... 348/211.99 |
| 2006/0206911 A1* | 9/2006 | Kim et al. ........................ 725/12 |
| 2008/0181460 A1 | 7/2008 | Tamaru |
| 2008/0225117 A1* | 9/2008 | Seo ................................ 348/143 |
| 2009/0016607 A1* | 1/2009 | Chono .......................... 382/181 |
| 2010/0013977 A1 | 1/2010 | Suzuki |
| 2010/0265353 A1 | 10/2010 | Koyama et al. |
| 2011/0123068 A1* | 5/2011 | Miksa et al. .................. 382/105 |
| 2012/0008915 A1* | 1/2012 | Takahashi et al. ............ 386/240 |

FOREIGN PATENT DOCUMENTS

| JP | 2000-232609 | 8/2000 |
| JP | 2008-187591 | 8/2008 |
| JP | 2010-268441 | 11/2010 |
| JP | 2011-059977 | 3/2011 |
| WO | 2008/072374 | 6/2008 |

* cited by examiner

*Primary Examiner* — Vikkram Bali
*Assistant Examiner* — Tracy Mangialaschi
(74) *Attorney, Agent, or Firm* — Panasonic Patent Center

(57) ABSTRACT

An image editing apparatus includes an input unit configured to input a moving image stream that includes a plurality of frames, an extracting unit configured to extract a specific subject from at least one of frames included in the input moving image stream, and an image processor configured to determine whether or not to perform a mask processing to the specific subject included in the at least one frame of the input moving image stream according to a predetermined output condition which is defined based on at least an output resolution of the moving image stream to be output, and performs the mask processing to the specific subject based on the determination result.

10 Claims, 17 Drawing Sheets

Fig. 8A

< MASK TABLE >

| | ID | SUBID | TIME | CENTER CORDINATES (X,Y) | WIDTH (W) | HEIGHT (H) | FEATURE AMOUNT | |
|---|---|---|---|---|---|---|---|---|
| A { | A | 1 | t1 | (5,5) | 10 | 10 | AAA | } A1, A2 |
| | A | 2 | t2 | (30,20) | 30 | 30 | AAA' | |
| | A | 4 | t4 | (40,40) | 10 | 10 | AAA''' | } DISAPPEAR |
| | A | 5 | t5 | (0,0) | 0 | 0 | - | |
| | B | 1 | ... | ... | ... | ... | ... | |
| | ... | ... | ... | ... | ... | ... | ... | |

150

IMAGE EDITING APPARATUS

BACKGROUND

1. Technical Field

The present disclosure relates to an image editing apparatus which performs predetermined image processing on an image.

2. Related Art

Generally, privately taken still images and moving images have only been available for the person who taken the images and limited people as the family members and friends of the person. As the digital camera and the smart phone are prevailing and the information sharing service via networks such as blogs and Social Networking Service (SNS) have come into general use, individual persons have more chances to exhibit privately taken still images and moving images to unspecified number of people, which has been raising people's awareness about the privacy and the right of portrait.

As an apparatus for protecting privacy and the right of portrait, an image processing apparatus as disclosed in Japanese patent application publication JP 2000-232609 A is known, which identifies a predetermined subject in the taken images and applies a special effect such as blurring to the identified subject.

When a moving image taken by a digital camera or a smart phone is exhibited to unspecified number of people on a network through blogs or SNSs (Social Networking Services), it is desirable to easily perform the minimum necessary amount of image processing without degrading the original image quality and details while protecting the privacy and the right of portrait.

The present disclosure is directed to an image editing apparatus for editing a moving image capable of easily protecting the privacy and the right of portrait without degrading the original image quality and details, in the case where the image is exhibited to unspecified number of people on a network through blogs or the SNSs.

SUMMARY

An image editing apparatus of the present disclosure includes an input unit configured to input a moving image stream that includes a plurality of frames, an extracting unit configured to extract a specific subject from at least one of the frames included in the input moving image stream, and an image processor configured to determine whether or not to perform a mask processing on the specific subject included in the at least one frame of the input moving image stream according to a predetermined output condition which is defined based on at least an output resolution of the moving image stream to be output, and performs the mask processing on the specific subject based on the determination result.

According to the present disclosure, the minimum necessary amount of special effect processing (mask processing) is performed on a moving image to be output according to the resolution of the moving image when the moving image to be exhibited to an unspecified large number of people on a network through blogs or the SNS is edited. As a result, the privacy and the right of portrait can be protected without excessively degrading the original image quality and details.

BRIEF DESCRIPTION OF DRAWINGS

FIG. 8A is a diagram showing an example of structure of a mask table according to the embodiment;

DETAILED DESCRIPTION OF PRE EMBODIMENTS

Figure 1:
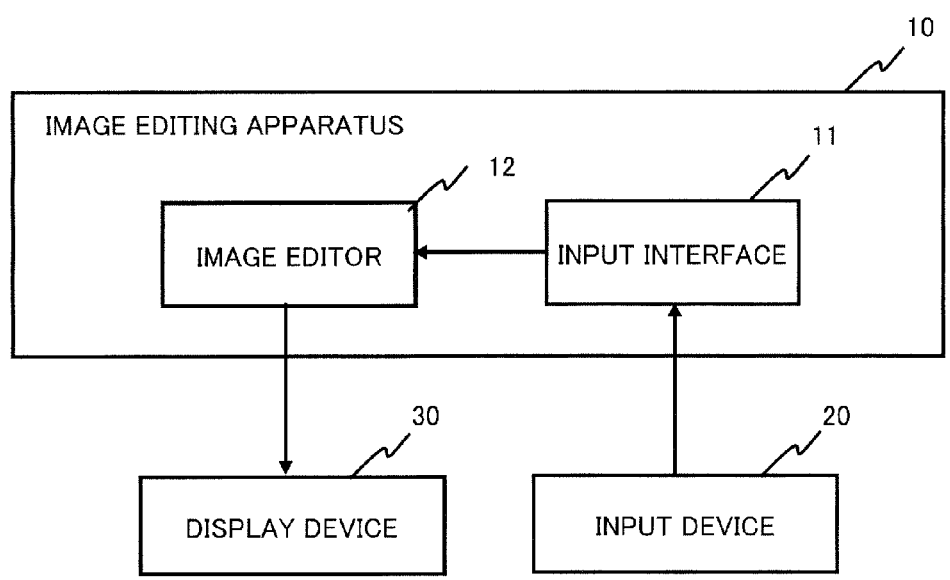
FIG. 1 is a diagram illustrating a basic configuration of an image editing apparatus of the present disclosure.

Embodiments will be described below in detail with reference to the drawings as required. However, unnecessarily detailed description may be omitted. For example, detailed description of already known matters and redundant description of substantially the same configuration may be omitted. All of such omissions are for preventing the following description from becoming unnecessarily redundant and facilitating understanding by those skilled in the art. The inventor(s) provides (provide) the attached drawings and the following description for those skilled in the art to fully understand the present disclosure, and does (do) not intend to limit the subject matters recited in the claims by them.

First Embodiment

An image editing apparatus according to the first embodiment can apply mask processing (special effect), such as blurring processing, on a subject contained in an input video stream to protect the privacy and the right of portrait. The image editing apparatus determines whether or not to apply the mask processing on a target object (a whole person, a person's face, a whole vehicle, a license plate of a vehicle) of the mask processing, based on the resolution and the size of the moving image to be output. Then, the image editing apparatus synthesizes (combines) the original image with an image for applying the mask processing to the target object which is determined to be subject to the mask processing.

Specifically, 1) the image editing apparatus scans the whole input video stream to extract an object which satisfies a predetermined condition related to a target of the mask processing, and generates a mask table based on the extraction results. Then, 2) the image editing apparatus decides an object to which the mask processing is applied from among the objects which satisfy the predetermined condition and are managed in the mask table, based on the resolution and the like of the moving image to be output, and applies the mask processing only to the decided objects.

According to that configuration, the mask processing is applied on not all of the objects which satisfy the predetermined condition related to the target of the mask processing, but applied on a part of objects, which are decided as the target of the mask processing in consideration of the resolution and the like of the moving image to be output. Therefore, the image processing (mask processing) is enabled only to the minimum necessary number of objects decided as the target of the mask processing in accordance with the resolution of the moving image to be output, and accordingly, the privacy and the right of portrait can be protected without degrading the original image quality and details.

In the following description, an information unit which describes information, at a certain time point, about center coordinates, width, height, feature amount, and the like of the object to be applied the mask processing is referred to as "mask scene".

Also, an information unit which describes information about the center coordinates, the width, the height, and the feature amount of the object to be applied the mask processing in a time unit (time range) during which the object continuously appears in the input video stream, is referred to as "mask object".

That is, an aggregation of mask scenes in a continuous time range (time unit) for the object to be applied the mask processing is a mask object. Therefore, such an entity as mask object does not exist from the beginning, but aggregating the mask scenes generates an information unit defined as a mask object. However, it will be expressed below as appending a mask scene to a mask object, for convenience of description below.

Now, the first embodiment will be described.

1-1. Overall Configuration

Before describing a specific embodiment, an overall configuration of a system using an image editing apparatus in an embodiment will be described at first.

FIG. 1 is a block diagram illustrating a basic configuration of an image editing apparatus according to an embodiment. The image editing apparatus 10 is electrically connected to an input device 20 and a display device 30. Here, the expression "electrically connected" includes not only wired connection using a wire such as copper wire or optical fiber but also wireless connection that transmits information via electromagnetic wave. The image editing apparatus 10 is electronic equipment typically having a processor such as a personal computer (hereafter, referred to as "PC") or a personal digital assistant. The image editing apparatus 10 may be a server installed in a data center or the like. In that case, the input device 20 and the display device 30 may be an input/output device which is included in or connected to the electronic equipment which is operated by a user at a remote location.

The image editing apparatus 10 matches the "target condition" with the whole input moving image file. The "target condition" is information specifying an object (candidate for the mask object) which has the privacy or the right of portrait, such as a whole person, a person's face, a whole vehicle, a license plate of a vehicle. Then, the image editing apparatus 10 manages, in a mask table, temporally consecutive region information such as a series of the center coordinates, the width, and the height for an object that agrees with the "target condition". That is, the mask table shows a range specified as a target condition for a subject to be continuously present in the moving image at predetermined time intervals.

For applying the special effect specified as "special effect setting" to the mask object corresponding to the "output condition", the image editing apparatus 10 has functions of generating a moving image by synthesizing the special effect with the input image and outputting the result as a moving image file. The "output condition" includes an output resolution condition and an output region. The output resolution condition is a condition of resolution which is used for determining whether or not to perform masking on the subject, regarding a resolution of a moving image file which is used in a server to be exhibited to unspecified number of people on a network or a resolution of a moving image file which is to be subject to compression-encoding for upload. An output region is a determination criterion for determining whether or not to perform masking on the subject in terms of the size of an object, and the output region is represented by the width, the height, and the area of the mask object. The width, the height, and the area of the mask object are decided based on, for example, whether a user could be able to visually recognize the target when it is displayed on the display device.

Although it is described that a user can optionally set the output resolution condition and the output region separately in the embodiment, the present embodiment is not limited to that. That is, the image editing apparatus may be adapted to use the output region which is decided only based on the output resolution set by the user. Further, the output resolution condition and the output region may be predefined according to the type of the target such as a person or a license plate of a vehicle.

The "special effect setting" is the setting for specifying the type of mask processing, to be applied to the mask object according to the "output condition", such as "blurring", "mosaic processing", "synthesizing with another image", and "synthesizing with a highlighting frame". The mask processing is a processing which processes an image including a specific subject so that the specific subject cannot be visually identified as it is. The image editing apparatus may use other effects such as paint, negative, mono-color, moire, solarization, defocusing, and enhancing by changing the level information other than the "mosaic processing" and the "blurring".

In the present embodiment, it is described that the user can optionally set the special effect, but the special effect may be automatically set. That is, the special effect may be predefined according to the type of the target object such as a person or a license plate of a vehicle or according to the frame occupancy of the target object.

The image editing apparatus 10 has an input interface 11 configured to receive a moving image file to be processed via the input device 20. Further, the image editing apparatus 10 has an image editor 12 configured to generate a mask table based on the input information and also, to apply the special effect to a specific region of a moving image file based on the mask table to generate a moving image applied with the special effect. An operation of generating a mask table by the image editing apparatus 10 will be described in detail later.

The input interface 11 is a device configured to receive the information input from the input device 20 and may be a USB port or a communication port, for example. When the input device 20 is a device such as an HDD, the input interface 11 may be a communication interface or a bus which enables communication between the input device 20 and the image editor 12. The information input to the input interface 11 is transferred to the image editor 12. Alternatively, the information may be recorded in a memory which is not shown. The input interface 11 receives input of the moving image file as an object to be edited, the target condition, the output condition, and the special effect setting, which are specified by the user or the like.

The image editor 12 generates the moving image which has the special effect applied to its particular part (the moving image undergone the mask processing) according to the moving image file, target condition, output condition, and special effect setting, which are specified by the user or the like. The generated moving image may be, for example, saved in a memory (not shown) and displayed on the display device 30.

The image editor 12 displays the moving image which has been optimally subject to the mask processing on the display device 30, according to the user-specified output condition.

With the above described configuration, the image editing apparatus 10 can easily protect the privacy and the right of portrait of the user-specified moving image file by applying the minimum necessary amount of image mask processing on the resolution to be output without degrading the original image quality and details.

1-2. Configuration of Image Editing Apparatus

The image editing apparatus 10 according to the embodiment will be described. In the embodiment, the image editing apparatus 10 is implemented by a personal computer (hereinafter, referred to as "PC") 100. The PC for implementing the image editing apparatus 10 can easily protect the privacy and the right of portrait of the user-specified moving image file by performing the minimum necessary amount of image mask processing on the output resolution without degrading the original image quality and details.

1-2-1. Configuration of PC (Image Editing Apparatus)

Figure 2:
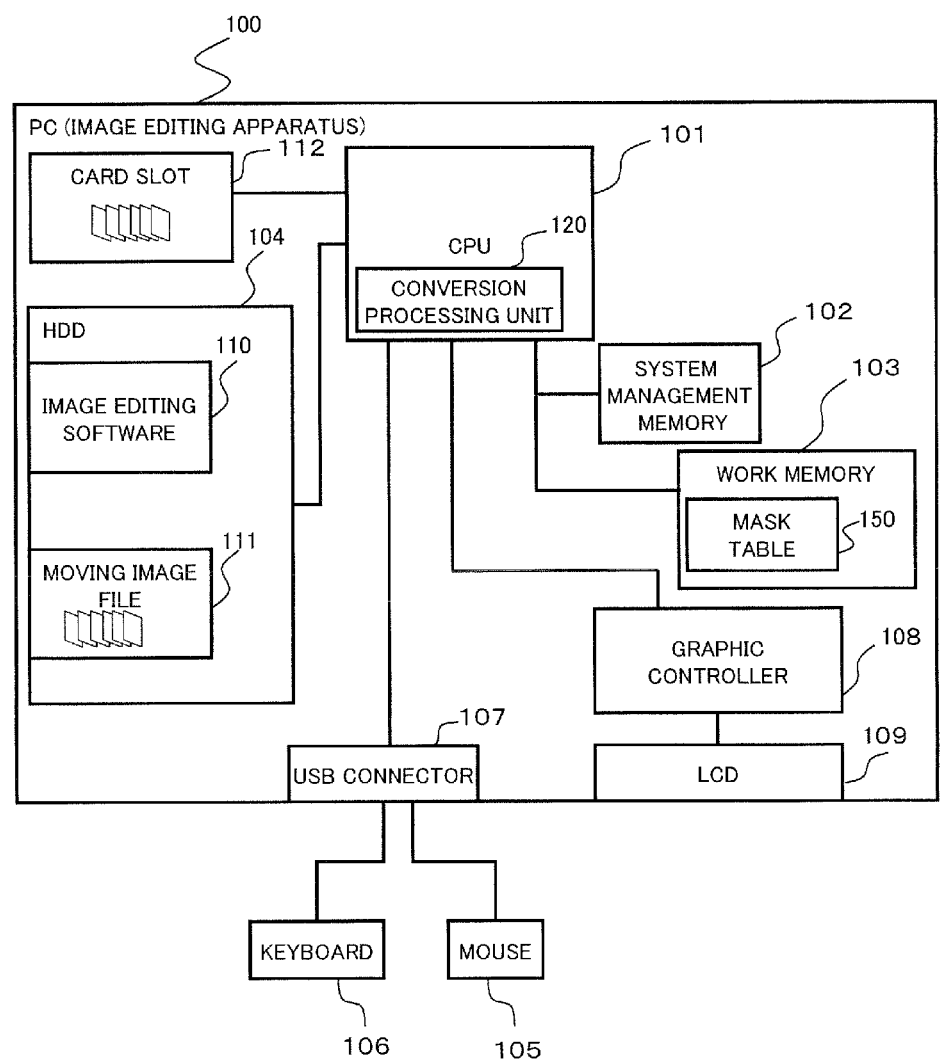
FIG. 2 is a block diagram of a personal computer (PC) according to an embodiment.

The configuration of the PC 100 for implementing the image editing apparatus 10 will be described with reference to FIG. 2. FIG. 2 is a block diagram illustrating an overall configuration of the PC 100.

The PC 100 includes a central processing unit (CPU) 101, a system management memory 102, a work memory 103, a hard disk drive (HDD) 104, a USB connector 107, a graphic controller 108, a liquid crystal display (LCD) 109, and a card slot 112. A mouse 105 and a keyboard 106 may be connected to the USB connector 107. A device which stores or can output moving image data may also be connected to the USE connector 107. The USB connector 107 corresponds to the input interface 11 of FIG. 1. Although the PC 100 may further include components which are not shown, such components are not essential of the present embodiment, and thus description thereof will be omitted. Although a notebook computer equipped with the liquid crystal display 109 is assumed as the PC 100 in the embodiment, the PC 100 may be a desktop computer or a tablet computer. The CPU 101 realizes a function of the image editor 12.

The CPU 101 is a processing unit for performing the processing of the PC 100. The CPU 101 is electrically connected to the system management memory 102, the work memory 103, the HDD 104, the graphic controller 108, and the USB connector 107. The CPU 101 can change the screen (image) displayed on the liquid crystal display 109 with the graphic controller 108. Further, the CPU 101 receives information about user's operation on the mouse 105 or the keyboard 106 via the USB connector 107. The CPU 101 also globally controls over the system operation including the power supply to the respective components of the PC 100.

The system management memory 102 stores an operating system (OS) and the like. The system management memory 102 also stores the system time and the like. The system time is updated when the CPU 101 operates the program of the OS.

The work memory 103 temporarily stores information necessary for the CPU 101 to perform the respective processing. The CPU 101 uses the work memory 103 as a work space which is a region for storing a mask table 150 for the user-specified moving image file. The work memory 103 stores information about the user-specified moving image file, the user-specified target condition, output condition, special effect setting, and the mask table 150.

The HDD 104 is a large-capacity recording medium and stores image editing software 110 and a moving image file 111.

The mouse 105 is a pointing device for the user to use in the editing operation. The keyboard 106 is a keyboard device for the user to enter text data, and so on in the editing operation.

The user operating the mouse 105 and the keyboard 106 can select the moving image file 111 and specify the target condition, the output condition, the special effect setting, and the preview playback, on the screen provided by the image editing software 110.

The USB connector 107 is a connector for connecting the mouse 105 and keyboard 106 with the PC 100.

The graphic controller 108 is a device for converting the screen information calculated by the CPU 101 into video format and sends the screen information to the liquid crystal display 109.

The liquid crystal display 109 is a display device configured to display the screen information converted into video format by the graphic controller 108. The screen information may be displayed not only on the liquid crystal display 109 but also on an external display.

The card slot 112 is an interface which can receive an inserted memory card. The CPU 101 can read a moving image file stored in the memory card. The CPU 101 can also write a moving image file stored in the memory card into the HDD 104 as required.

The CPU 101 reads the image editing software 110 stored in the HDD 104 into the work memory 103 and executes it. According to the image editing software 110, the CPU 101 performs the following processes.

(1) Via the USB connector 107, receive the selection operation and specifying operation performed by the user on the mouse 105 or the keyboard 106.

(2) Read the moving image file 111 selected by the user.

(3) Receive input of "target condition", "output condition", and "special effect setting" made by the user.

(4) According to the "target condition" specified by the user, create the mask table 150 for the moving image file.

(5) Send out the image information which results from combining an image of the special effect with the original image (the moving image undergone the mask processing) within a specific region of the moving image according to the mask table 150 and the user-specified "output condition (s)" and "special effect setting" toward the graphic controller 108 to cause the liquid crystal display 109 to display the preview.

(6) Send out the image information which has the special effect combined (synthesized) with the specific part of the moving image file (the moving image undergone the mask processing) to a conversion processing unit 120 to store the combined result in the HDD 104.

The moving image file 111 is generally compressed in a predetermined format. Therefore, the PC 100 decodes the compressed moving image file in the conversion processing unit 120. The conversion processing unit 120 also has a function of encoding a moving image file into a particular format.

Although the conversion processing unit 120 is described as one of the processing functions of the CPU 101 in the embodiment, it may be implemented as a function external to the CPU 101.

1-2-2. Configuration of Conversion Processing Unit

Figure 3:
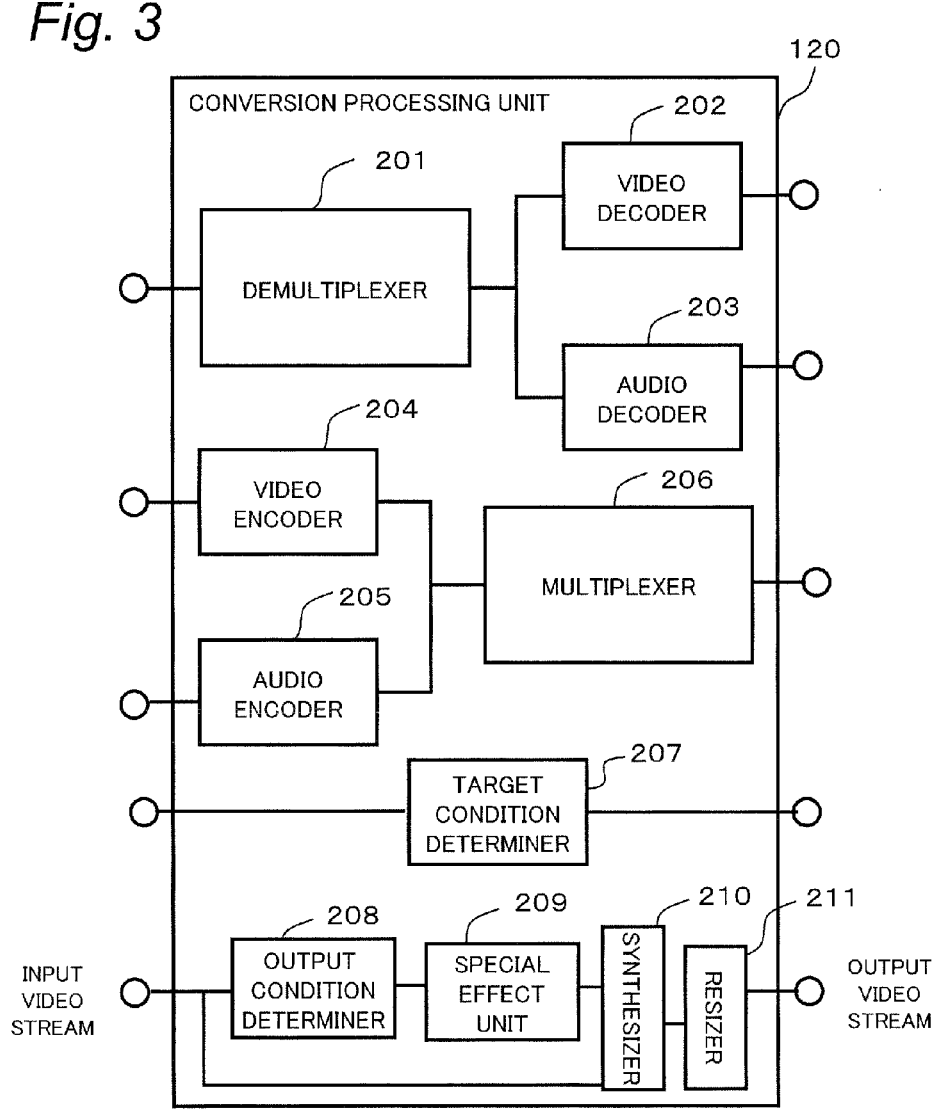
FIG. 3 is a block diagram of a conversion processing unit according to the embodiment.

A detailed configuration of the conversion processing unit 120 of the PC 100 will be described with reference to FIG. 3. The conversion processing unit 120 performs decompression decoding on the moving image file 111 which has been compressed and encoded and is stored in the HDD 104 and performs compression coding on the moving image file 111. The conversion processing unit 120 includes a demultiplexer 201 for performing the decompression decoding, and a video decoder 202 and an audio decoder 203 for performing the compression coding. Further, the conversion processing unit 120 includes a video encoder 204, an audio encoder 205, and multiplexer 206. The conversion processing unit 120 also has a target condition determiner 207. The conversion processing unit 120 also has an output condition determiner 208, a special effect unit 209, a synthesizer 210, and a resizer 211.

The demultiplexer 201 inputs an AV stream multiplexed in a specific file format such as AVCHD (registered trademark), and separates the input AV stream into a video stream and an audio stream. The video stream separated from the AV stream is sent to the video decoder 202 and the audio stream separated from the AV stream is sent to the audio decoder 203.

The video decoder 202 performs decompression decoding on the video stream separated from the AV stream by the demultiplexer 201. The audio decoder 203 performs the decompression decoding on the audio stream separated from the AV stream by the demultiplexer 201. Respective kinds of data resulting from the decompression decoding performed by the video decoder 202 and the audio decoder 203 are stored in the work memory 103. The data stored in the work memory 103 is read out upon the image editing as required.

The video encoder 204 performs compression coding on the input video stream according to a predetermined moving image recording format, and the video stream undergone the compression coding is sent to the multiplexer 206. Similarly, the audio encoder 205 performs compression coding on the input audio stream according to a predetermined audio recording format, and the audio stream undergone the compression coding is sent to the multiplexer 206.

The multiplexer 206 multiplexes the video stream output from the video encoder 204 and the audio stream output from the audio encoder 205 into an AV stream, and outputs the AV stream. The AV stream output from the multiplexer 206 is stored in the work memory 103 or the HDD 104.

The target condition determiner 207 analyzes the input moving image and determines a region containing the target object in the image based on the feature of the target object according to the set target condition (a whole person, a person's face, a whole vehicle, a license plate of a vehicle) by using an image recognition technology. The target condition determiner 207 registers a subject region which agrees with the target condition in the mask table 150 as a mask object. Specifically, the center coordinates, the widths, and the heights of a series of the temporally consecutive mask object regions are registered in the mask table 150.

The output condition determiner 208 determines whether it is necessary to perform the special effect processing on the input video stream based on the mask table 150 registered by the target condition determiner 207 and the output condition which has been set.

The special effect unit 209 generates a special effect image according to the special effect setting set by the user with respect to a region of the image which has been determined that the special effect is needed by the output condition determiner 208 (a region of the mask object).

The synthesizer 210 performs the synthesizing processing on the input video stream with the special effect image generated by the special effect unit 209 (a moving image region undergone the mask processing), so that the special effect processing is applied to a region of the image which is determined that the special effect is needed. With respect to a frame to which the special effect unit 209 outputs nothing, the synthesizer 210 outputs the input video stream to the resizer 211 without performing the synthesizing processing.

The resizer 211 performs resize processing on the moving image which has undergone the synthesizing processing in the synthesizer 210 (for the frame which has not undergone the synthesizing processing, the moving image indicated by the original input video stream) according to the output resolution condition, and generates the output video stream. The generated output video stream is input to the video encoder 204, and multiplexed with the audio stream which has been coded and generated in the audio encoder 205, and output as the AV stream.

Figure 4:
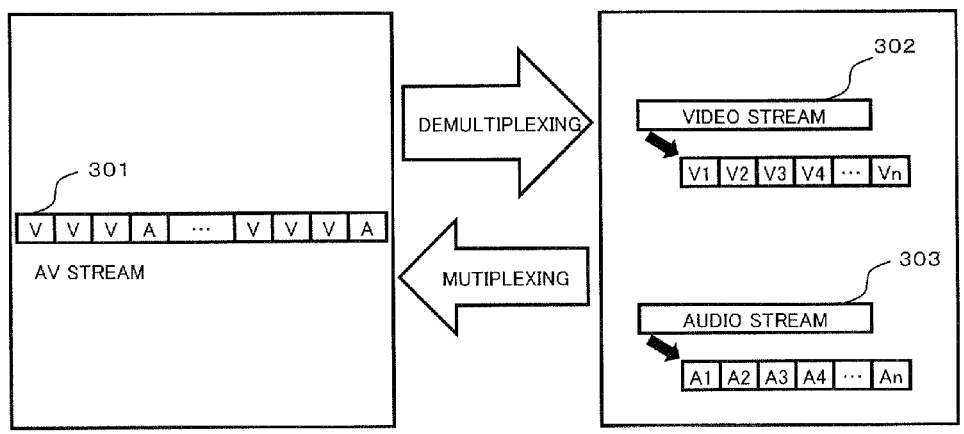
FIG. 4 is a view illustrating a multiplexing processing according to the embodiment.

FIG. 4 is a diagram illustrating the separating the AV stream into the video stream and the audio stream by the demultiplexer 201 and the multiplexing the video stream and the audio stream into the AV stream by the multiplexer 206, respectively.

The AV stream 301 is a stream generated by multiplexing video packs V and audio packs A which are created by adding time information and the like to a predetermined unit of data (Vk, Ak) (k=1, 2, . . . , n) into one stream which enables synchronous playback of video and audio data. Here, an explanation is made by taking an example of a stream compatible with AVCHD (registered trademark) for video. The demultiplexer 201 performs data processing for separating the multiplexed AV stream 301 into a video elementary stream 302 and an audio elementary stream 303. The multiplexer 206 performs data processing for multiplexing the video elementary stream 302 and the audio elementary stream 303 into the AV stream 301.

The stream structure is not limited to that illustrated in FIG. 4. That is, an uncompressed stream can be applied to the present disclosure as far as the CPU 101 can read video information from the stream.

1-2-3. Configuration of the Selection Screen

Figure 5:
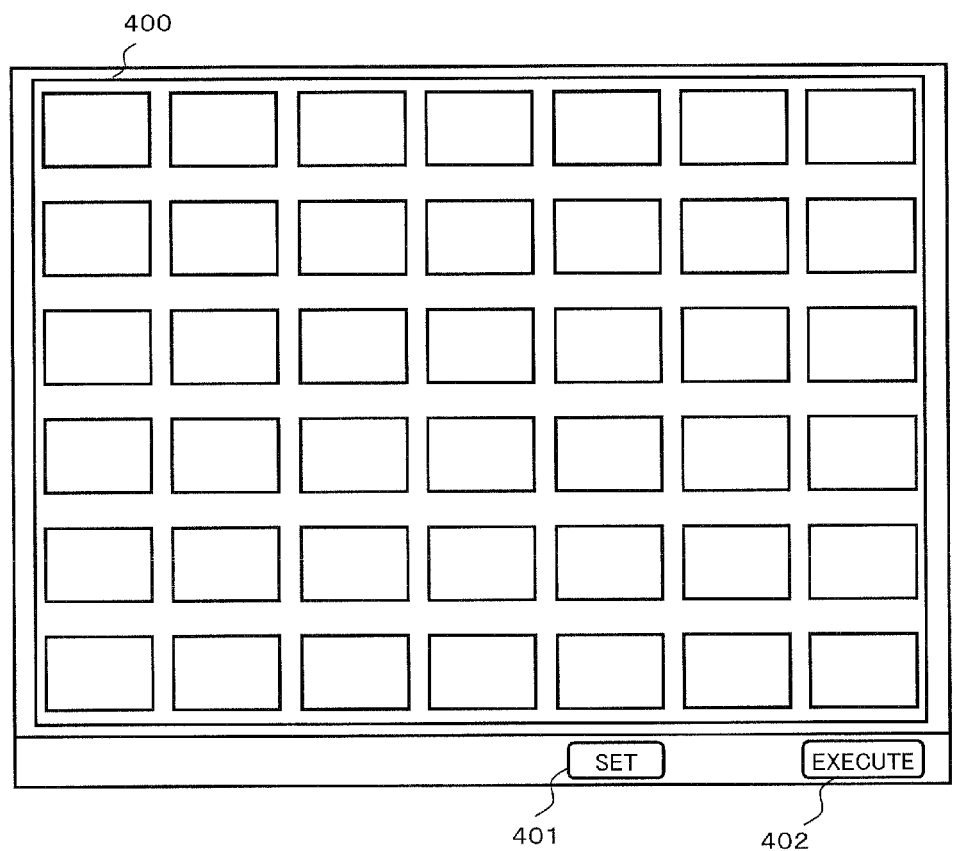
FIG. 5 is a view of an image selection screen displayed on a liquid crystal display according to the embodiment.

FIG. 5 illustrates a selection screen for moving image files displayed on the liquid crystal display 109. The moving image file to be subject to the mask processing is selected by the user on the selection screen. As illustrated in FIG. 5, the selection screen contains a selection area 400, a setting button 401, and an execute button 402.

The moving image files displayed on the selection area 400 may be all of moving image files stored in the HDD 104, or may be those selectively extracted which are stored in a specific folder. Alternatively, it may be moving image files which are further selected by the user from the moving image files stored in the specific folder.

The setting button 401 is a button for displaying the setting screen (FIG. 6) which is for setting the target condition, the output condition, and the special effect setting. Details of the setting screen (FIG. 6) will be described later.

Figure 6:
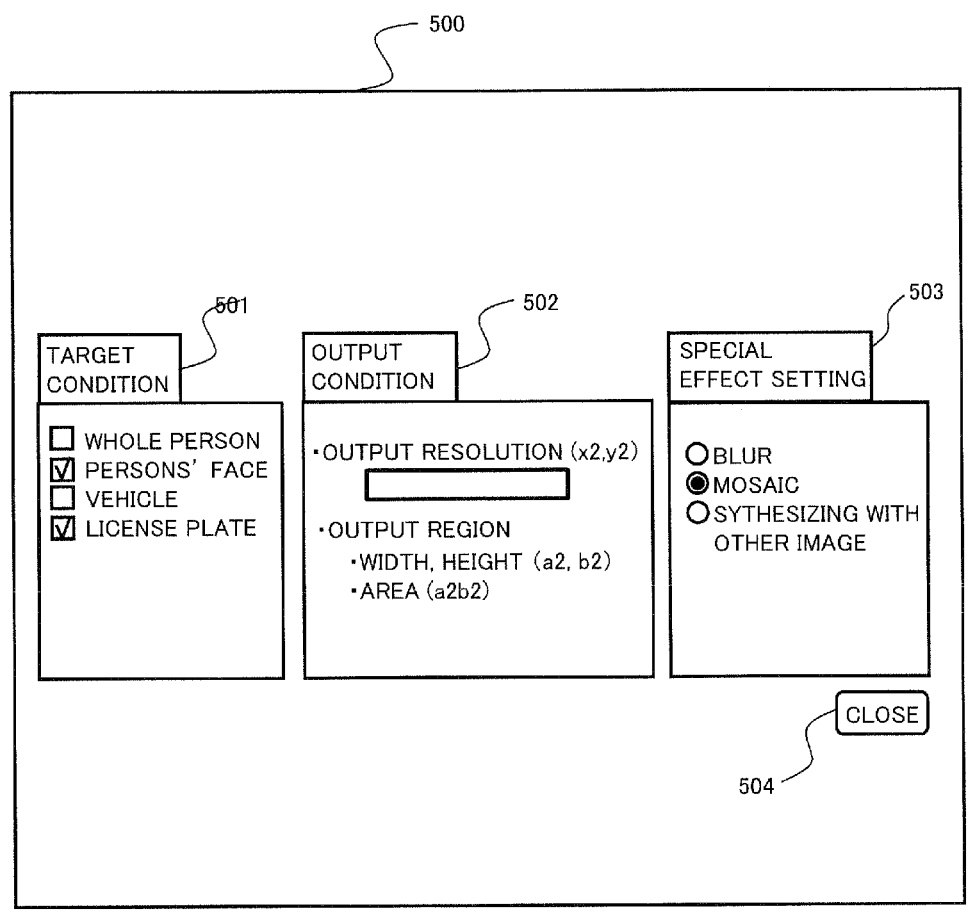
FIG. 6 is a view of a setting screen displayed on a liquid crystal display according to the embodiment.

When the execute button 402 is pressed by user operating the mouse 105, processing of generating the mask table 150 is performed on the moving image file selected in the selection area 400 according to a condition preset on the setting screen (FIG. 6). Details of the processing of generating the mask table 150 will be described later.

1-2-4. Configuration of Setting Screen

The configuration of the setting screen displayed on the liquid crystal display 109 for setting the target condition, the output condition, and the special effect setting will be described with reference to FIG. 6. The setting screen 500 illustrated in FIG. 6 is displayed on the liquid crystal display 109 in response to pressing of the setting button 401 in the selection screen illustrated in FIG. 5. As illustrated in FIG. 6, the setting screen 500 contains a selection menu for the target condition 501, a selection menu for the output condition 502, a selection menu for the special effect setting 503, and a close button 504.

The target condition 501 is a condition for specifying a target object which is to be subject to the special effect processing to protect the privacy and the right of portrait. For example, it is a condition specifying the target object which can determine a region containing the target object such as a whole person, a person's face, a whole vehicle, a license plate of a vehicle. The region containing the target object can be determined based on the features of the target object by using a generally known image recognition technology. The target object specified by the user is to be a candidate for the mask object. A plurality of target objects may be selected on the selection menu for the target condition 501. For example, in the example illustrated in FIG. 6, a person's face and a license plate of a vehicle are specified as the target objects. Incidentally, in the image editing apparatus 10, an object (exceptional target) which is desired to be excluded from the target objects, such as a face of a user's family member, can be previously registered. Even in the case where a person's face is specified as the target object, the face previously registered as an exceptional target can be excluded from the target objects.

The output condition 502 is a condition (determination criterion) for determining whether the special effect processing for protecting the privacy and the right of portrait is to be applied on the object which satisfies the target condition 501. Specifically, the output conditions 502 include the resolution of the moving image to be output (output resolution) and a condition (threshold value) of a region (output region) on which the special effect processing is applied. The condition of the output region includes conditions (threshold values) as the width, the height, and the area of the target object of the special effect processing. The user can select the output condition on the selection menu for the output conditions. The output condition may be displayed in a selectable way in the form of pull-down menu, for example. In this case, the resolution of the moving image for uploading the moving image may be automatically specified to the destination server. Alternatively, it may be configured to allow the user to input any resolution.

The special effect setting 503 is information for setting the special effect to be applied to a region of an image which is determined from the mask table 150 and the output condition. The user can alternatively select the type of the special effect (mask processing) to be applied to the masking target on the selection menu for the special effect setting. The special effect setting 503 includes the setting of "blurring", "mosaic processing", "synthesizing with another image", and the like for applying visual processing to a region containing the target object to protect the right of portrait and the privacy.

The close button 504 is a button for closing the setting screen 500. When the close button 504 is pressed, the setting contents on the setting screen 500 are fixed and the setting screen 500 illustrated in FIG. 6 switches to the selection screen illustrated in FIG. 5.

1-2-5. Configuration of Preview Screen

Figure 7:
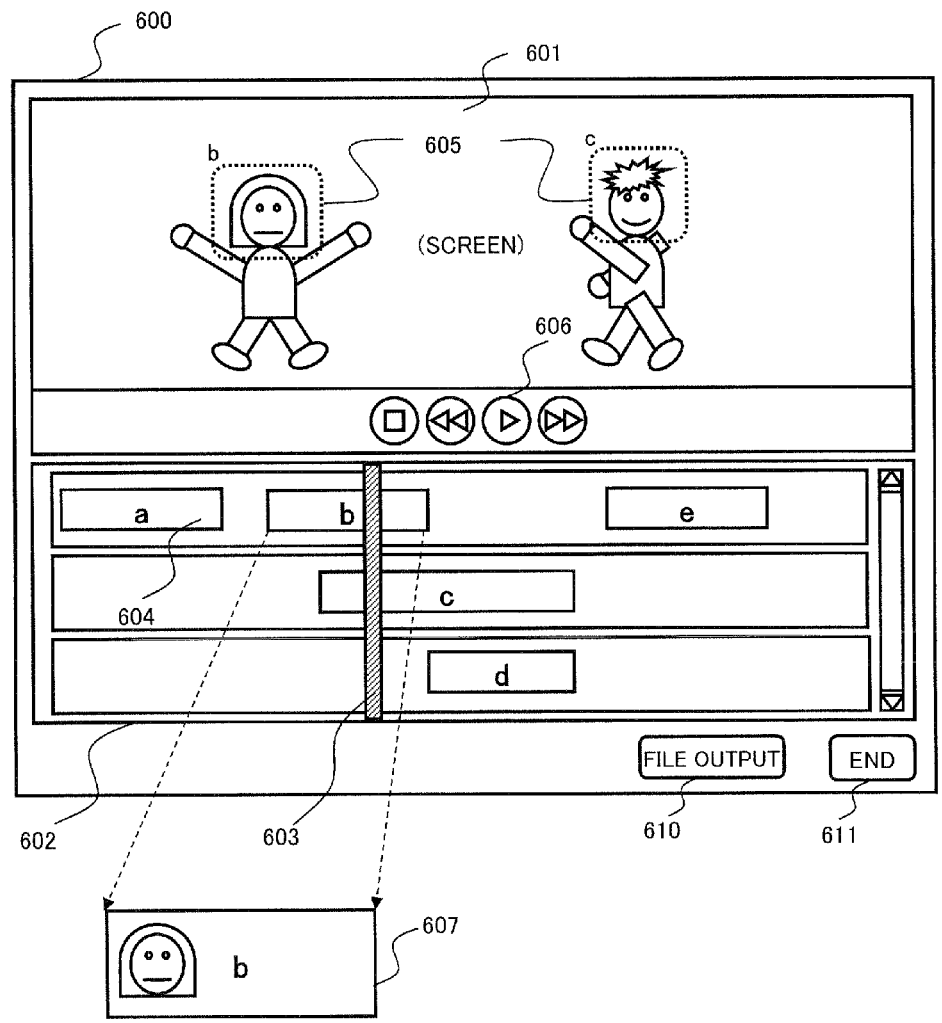
FIG. 7 is a view of a preview screen displayed on a liquid crystal display according to the embodiment.

Now, the Preview Screen Displayed on the Liquid Crystal Display 109 will be described with reference to FIG. 7. When the execute button 402 in the selection screen illustrated in FIG. 5 is pressed, the preview screen illustrated in FIG. 7 previews the result of the special effect processing to be displayed on the liquid crystal display 109. As illustrated in FIG. 7, the preview screen 600 displayed on the liquid crystal display 109 contains a preview area 601, a timeline area 602, a timeline bar 603, a mask object 604, a mask scene region 605, a preview button 606, a target object image 607, a file output button 610, and an end button 611.

The preview area 601 is an area for previewing (playing back) the video image which has the special effect applied to a specific region of the moving image according to the mask table 150 and the output condition 502 and the special effect setting 503 which are defined by the user. By viewing the preview area 601, the user can confirm the video image resulting from the special effect processing before outputting the moving image file. The user can also correct the special effect as required. For example, when a face of a user's family member which has been registered before as an exceptional target is mistakenly set to a masking target, the user can make correction to exclude the face of the user' family member.

The timeline area 602 is an area for confirming the playback position of the moving image on the time axis. In the timeline area 602, a plurality of rectangles (a, b, c, d, e, . . . ) representing mask objects are arranged. The mask objects 604 are arranged in the order of time series. Each of these rectangles indicates a time period from the start time to the finish time of displaying a subject which is the target of the mask object. That is, the start-edge of the rectangle indicates a start time of displaying a subject which is related to the mask object, and the end-edge of the rectangle indicates a finish time for displaying a subject which is related to the mask object. Each of the rectangles contains the image 607 which is the target of masking. Although not illustrated in FIG. 7, an icon indicating the corresponding target condition 501 (for example, an icon indicating that a person's face is taken as the target object), an icon indicating the corresponding output condition 502, or an icon indicating the corresponding special effect setting 503 (for example, an icon indicating the blurring processing) may be displayed. As a result, the user can confirm which time period on the moving image file has the mask object displayed, which mask object corresponds to the output condition 502, and which mask object is the target of the special effect setting 503.

The timeline bar 603 is a bar for indicating a time-position (time point) on the moving image file, and the video image is displayed on the preview area 601 in sync with a video image of the time-position indicated by the timeline bar 603.

The mask scene region 605 is a region based on the information unit (the center coordinates, the width, the height, the feature of the corresponding target object) contained in the mask object 604 at the time point indicated by the timeline bar 603 arranged in the timeline area 602. In FIG. 7, the two mask objects b and c are present at the time position indicated by the timeline bar 603, and the mask scene regions 605 corresponding to the respective mask objects b and c are displayed in the preview area 601. The mask scene region 605 is displayed with the special effect applied according to the output condition and the special effect setting (the result of the mask processing is displayed). It is noted that the region which is excluded from the targets of the special effect based on the output condition may be displayed with a highlighting frame or an icon. As a result, the user can easily confirm the object which is excluded from the target of the special effect according to the output condition although the object is recognized as an object to which the mask processing is applied. The image editing apparatus 10 may also be configured to be able to change the function so as to apply the mask processing on the object which is excluded from the target of the mask processing, according to the output condition to the target of the mask processing, as required.

The preview button 606 may be selected by operating the mouse 105. When the preview button 606 is pressed, the special effect specified in the special effect setting 503 is applied to the target object indicated by the mask object corresponding to the output condition 502, so that the moving image which is generated as a result of synthesizing the special effect with the input image is played back. Consequently, the user can confirm the moving image applied with the special effect.

The file output button 610 may be selected by operating the mouse 105. When the file output button 610 is pressed, the special effect specified by the special effect setting 503 is applied to the target object indicated by the mask object corresponding to the output condition 502, so that the moving image which is generated as a result of synthesizing the special effect with the input image is created.

The CPU 101 creates a moving image file according to the contents of the output conditions 502 by operating the respective components of the conversion processing unit 120 (the demultiplexer 201, the video decoder 202, the audio decoder 203, the output condition determiner 208, the special effect unit 209, the synthesizer 210, the video encoder 204, the audio encoder 205, the multiplexer 206) as described above.

The end button 611 may be selected by operating the mouse 105. The user can finish the image editing software 110 by pressing the end button 611.

1-2-6. Mask Table

The image editing apparatus 10 performs extracting of an object which satisfies the target condition 501 through the input video stream from the start point to the end point. The image editing apparatus 10 stores the information unit (the center coordinates, the width, the height, and the feature amount) of the extracted object in the mask table 150 at predetermined time intervals within the time range in which the extracted object continuously appears. The mask table 150 will be described below.

FIG. 8A is a diagram showing an example of the mask table structure. As shown, the mask table holds information about the mask scene (ID, SUBID, time, center coordinates, width, height, feature amount, and the like).

In the example of FIG. 8A, the mask scene A is a region extracted based on the target condition 501 and is extracted by the target condition determiner 207 at predetermined frame intervals (i.e., predetermined sampling interval (dt). By performing the extraction processing at predetermined sampling intervals like that, it can reduce the process load. Although the extraction processing is performed at predetermined sampling intervals (dt) in FIG. 8A, the processing may be performed on the all frames of the moving image. The extraction processing is performed at each time period dt, and the information unit indicated by the region which has the same feature amount is managed as the same mask object. Here, when a difference between the feature amounts is within a predetermined allowable margin, it is determined that both of the feature amounts are the same feature amount. The same ID (A in FIG. 8A) is provided to the mask scenes which belong to the same mask object, and a serial number is provided as SUBID to a newly generated mask scene in the extraction processing performed at every time period dt.

However, even when the same mask scene is newly extracted, the mask scene is not appended to the mask table 150 in the case where the subject region (the center coordinates, the width, the height) indicated by the mask scene has not changed by a predetermined criterion (hereinafter, referred to as "append determination criterion") or more. That is, only when the extracted mask scene has greatly changed from the previous mask scene, the mask scene is appended to the mask table 150. With that configuration, it is possible to prevent the mask table 150 from swelling and to reduce the amount of the append processing. Now, the append determination criterion will be described.

The respective variations of the center coordinates ($X(t)$, $Y(t)$) the width $W(t)$, the height $H(t)$ of the subject region at the time t are defined as below:

$$dX=X(t)-X(t-dt)$$

$$dY=Y(t)-Y(t-dt)$$

$$dW=W(t)-W(t-dt)$$

$$dH=H(t)-H(t-dt).$$

The append determination criterion is defined as below as examples.

(1) Either of the variations of the center coordinates dX and dY after the sampling interval (dt) is not less than a reference value (threshold value).

(2) Either of the variation of the width dW and the variation of the height dH after the sampling interval (dt) is not less than a reference value (threshold value).

That is, when either of the above described conditions (1) and (2) is satisfied, it is considered that the append determination criterion is satisfied.

The present disclosure is not limited to that and the append determination criterion may be defined as below.

(1') Both of the variations of the center coordinates dX and dY after the sampling interval (dt) are not less than a reference value.

(2') Both of the variation of the width dW and the variation of the height dH after the sampling interval (dt) are not less than a reference value.

With the above case, when at least one of the above described conditions (1') and (2') is satisfied, it may be considered that the append determination criterion is satisfied.

Specific append processing of the mask scene will be described with reference to FIG. 8A and FIG. 8B. It is assumed that the append determination criterion is to satisfy either one of the above described conditions (1) and (2).

Figure 8B:
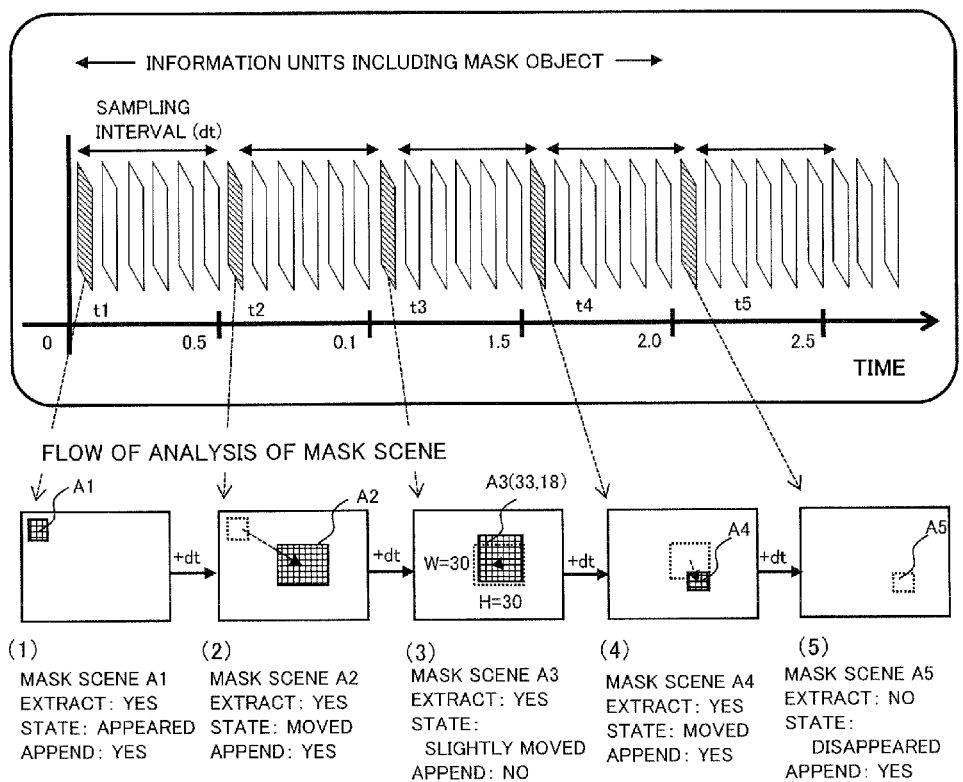
FIG. 8B is a diagram for describing extraction of a mask scene according to the embodiment.

(1) of FIG. 8B shows a case where it is determined that a mask scene A1 of the feature amount AAA appears for the first time in the region of the center coordinates (5,5), the width (10), and the height (10) at the time t1 by the mask scene extraction processing. In this case, all of X(t1−dt), Y(t1−dt), W(t1−dt), H(t1−dt) are zero. Accordingly, dX=X(t1), dY=Y(t1), dW=W(t1), dH=H(t1). It is assumed that, in that case, any one of dX, dY, dW, and dH satisfies the append determination criterion according to the above described conditions (1) and (2). Then, the CPU 101 (the target condition determiner 207 of the conversion processing unit 120) appends the mask scene A1 to the mask table 150.

(2) of FIG. 8B shows a case where a mask scene A2 of the feature amount AAA' is extracted at the position of the center coordinates (30,20), the width (30), and the height (30) at the time t2 by the mask scene extraction processing. In that case, it is considered that the subject of the mask scene A1 has moved to the position of the mask scene A1. At that moment, it is assumed that any one of dX, dY, dW, and dH described below satisfies the append determination criterion according to the above described conditions (1) and (2). Then, the CPU 101 appends the mask scene A2 to the mask table 150 according to the append determination criterion.

$$dX=X(t2)-X(t2-dt)=X(t2)-X(t1)$$

$$dY=Y(t2)-Y(t2-dt)=Y(t2)-Y(t1)$$

$$dW=W(t2)-W(t2-dt)=W(t2)-W(t1)$$

$$dH=H(t2)-H(t2-dt)=H(t2)-H(t1)$$

(3) of FIG. 8B shows a case where a mask scene A1 of the feature amount AAA" is extracted at the position of the center coordinates (33,18), the width (30), and the height (30) at the time t3 by the mask scene extraction processing. In that case, it is considered that the subject of the mask scene A2 has slightly moved to the position of the mask scene A3. At that moment, since the amount of movement of the subject of the mask scene A2 is small, it is assumed that none of dX, dY, dW, and dH described below do not satisfy the append determination criterion. Then, the CPU 101 does not append the mask scene A3 to the mask table 150 according to the append determination criterion (see FIG. 8A).

$$dX=X(t3)-X(t3-dt)=X(t3)-X(t2)$$

$$dY=Y(t3)-Y(t3-dt)=Y(t3)-Y(t2)$$

$$dW=W(t3)-W(t3-dt)=W(t3)-W(t2)$$

$$dH=H(t3)-H(t3-dt)=H(t3)-H(t2)$$

(4) of FIG. 8B shows a case where a mask scene A4 of the feature amount AAA''' is extracted at the position of the center coordinates (40,40), the width (10), and the height (10) at the time point t4 by the mask scene extraction processing. In that case, it is considered that the subject of the mask scene A3 has moved to the position of the mask scene A4. At that moment, it is assumed that any one of dX, dY, dW, and dH described below satisfies the append determination criterion according to the above described conditions (1) and (2). In that case, the CPU 101 appends the mask scene A4 to the mask table 150 according to the append determination criterion.

$$dX=X(t4)-X(t4-dt)=X(t4)-X(t3)$$

$$dY=Y(t4)-Y(t4-dt)=Y(t4)-Y(t3)$$

$$dW=W(t4)-W(t4-dt)=W(t4)-W(t3)$$

$$dH=H(t4)-H(t4-dt)=H(t4)-H(t3)$$

(5) of FIG. 8B shows a case where a mask scene is not extracted at the time t5 by the mask scene extraction processing. In that case, it is considered that the subject of the mask scene A4 has disappeared. Then, information indicating that the mask scene has disappeared is appended to the mask table 150. The information indicating that the mask scene has disappeared may be expressed by the center coordinates (0,0), the width (0), the height (0), for example.

1-3. Mask Processing Operation of Image Editing Apparatus

The mask processing operation of the image editing apparatus 10 will be described.

1-3-1. Outline of Mask table Creating Operation

Figure 9:
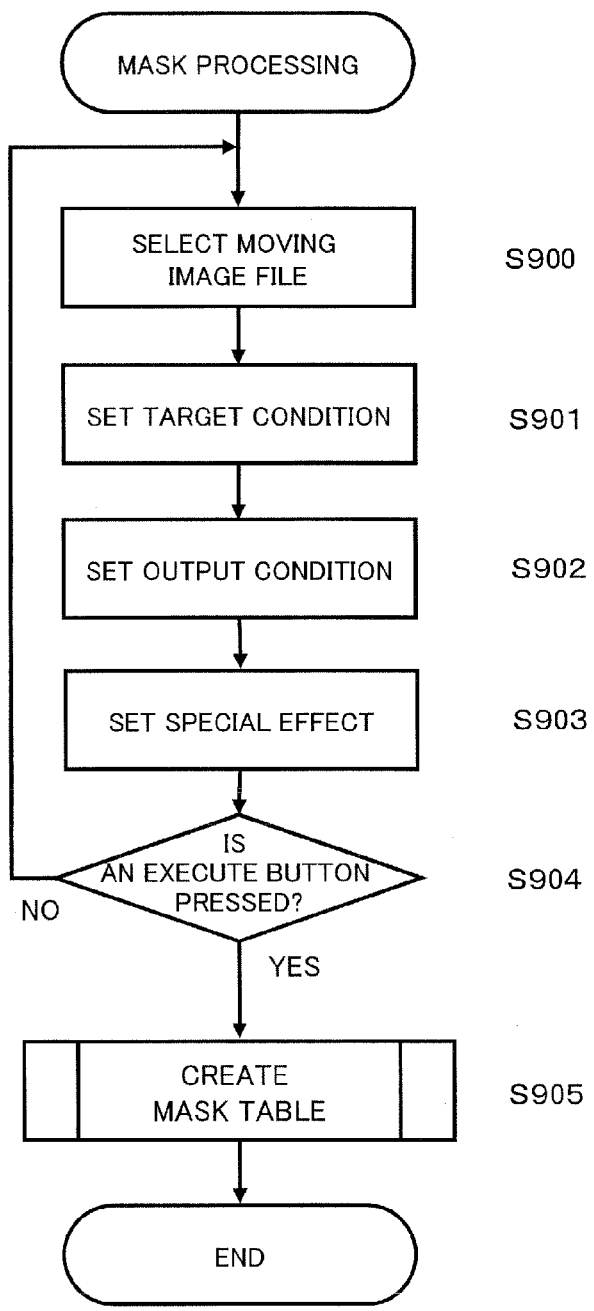
FIG. 9 is a flow chart describing creation of a mask table according to the embodiment.

A procedure for creating a mask table based on the selected moving image file, the specified target condition, the specified output condition, and the set special effect information. FIG. 9 is a flow chart describing the mask table creating processing according to the embodiment.

First, a moving image file to be a candidate is selected by the user on the selection screen (S900). Then, the target condition for the target object to be subject to the special effect is set by the user on the setting screen 500 (S901). Then, the output condition is set by the user as information about an output file (S902). Then, the special effect to be applied to the target region is set by the user (S903). The order of the operations from step S900 to step S903 may be changed. Alternatively, step S902 and step S903 may be performed after the mask table 150 is created.

When the selection of the moving image file, the setting of the target condition, the setting of the output condition, and the setting of the special effect are finished, the CPU 101 determines whether the execute button 402 on the selection screen is pressed by the user (S904). When the execute button 402 is pressed, the CPU 101 performs creation of the mask table 150 according to the selected moving image file and the contents of the target condition.

1-3-2. Details of the Mask Table Creating Operation

Details of the operation of creating the mask table 150 in step S905 will be described with reference to the flow chart of FIG. 10. The mask table 150 is a table for managing candidates to be subject to the special effect according to the user-specified particular conditions for the purpose of protecting the right of portrait and the privacy with respect to the moving image file selected by the user.

Figure 10:
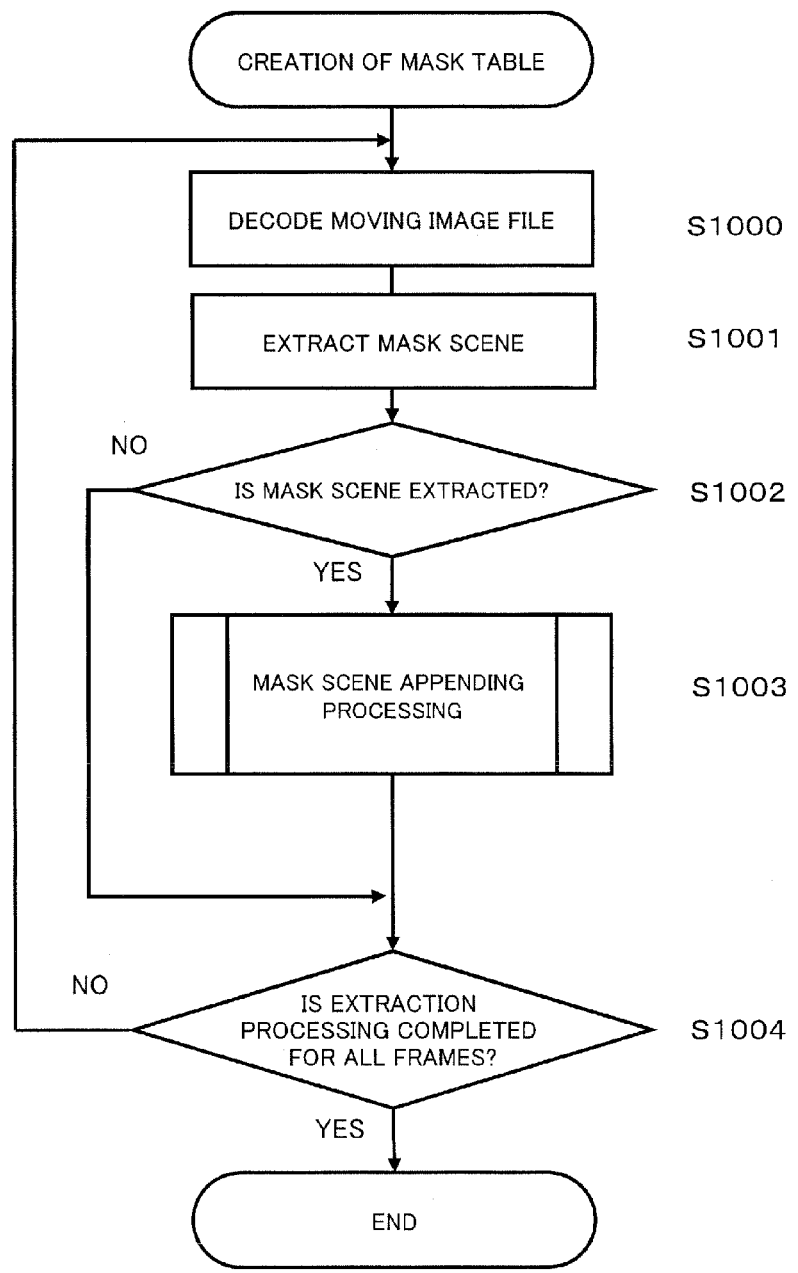
FIG. 10 is a flow chart describing detailed operation of creating a mask table according to the embodiment.

First, in the flow chart of FIG. 10, the CPU 101 decodes the moving image file selected in step 900 (S1000).

Next, the CPU 101 performs the processing of extracting a mask scene according to the target condition set by the user in step 901 (S1001). The subject region (the region 605 of FIG. 7) indicated by the mask scene is a rectangular region represented by the center coordinates, the width, and the height indicated for the mask scene A of FIG. 8A. Since a plurality of subjects may be present in one frame, subject regions indicated by a plurality of mask scenes may be present in the same frame. The processing of extracting a mask scene in step S1001 may be performed for each frame of the moving image or every predetermined frames of the moving image.

When the mask scene can be extracted (YES in step S1002), the CPU 101 performs the append processing of the extracted mask scene to the mask table 150 (S1003).

On the other hand, when the mask scene cannot be extracted (NO in step S1002), the CPU 101 proceeds to step S1004.

The CPU 101 determines whether the extraction processing is completed for all frames of the moving image file (S1004). The CPU 101 repeats the operation from step S1000 to step S1003 until the extraction processing is completed for all frames. When the extraction processing is completed for all frames (YES in S1004), the CPU 101 completes the processing of creating the mask table 150.

Figure 11:
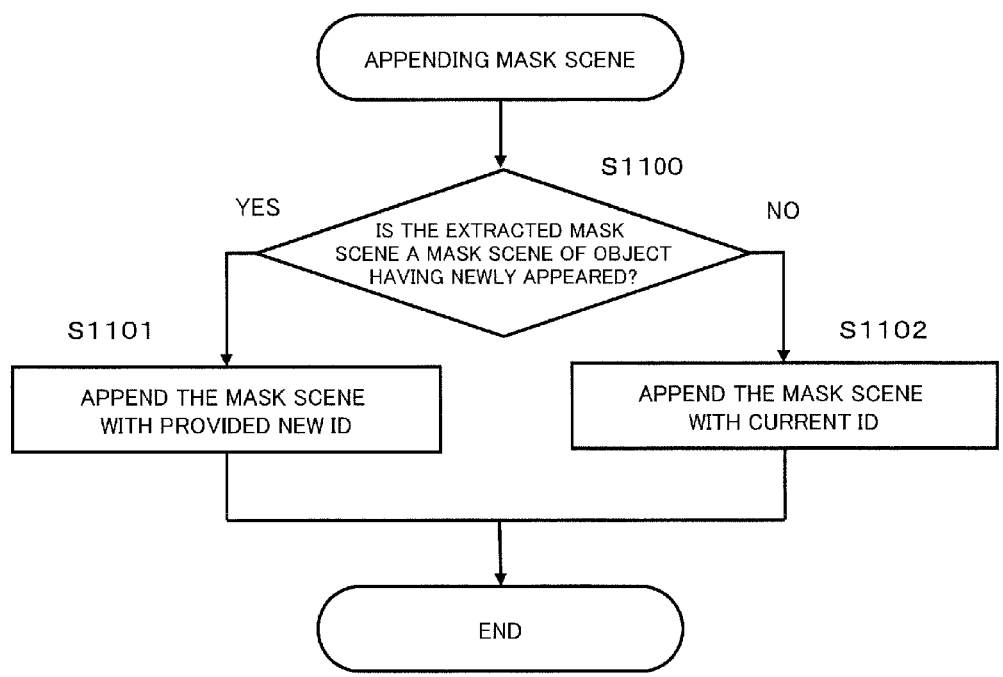
FIG. 11 is a flow chart describing detailed operation of appending a mask scene according to the embodiment.

Next, details of the append processing of the mask scene in step S1003 will be described with reference to FIG. 11. In the following description, it is assumed that the extraction of the mask scene in step S1001 is performed at the time t.

First, in step S1100, it is determined whether the extracted mask scene is a mask scene of a target object which has newly appeared. Specifically, it is determined whether the mask table 150 includes a mask object which has feature amount to be determined to be the same subject as the mask scene being processed at the time (t−dt). When such a mask object is not in the mask table 150, the extracted mask scene is determined to be the mask scene of the object having newly appeared (YES in S1100), then a new ID is given to the mask scene, and the new SUBID, the time, the center coordinates, the width, the height, and the feature amount are appended to the mask table 150 as information about that mask scene (S1101). At this moment, they are appended at the head of mask scene information of the new mask object.

Figure 12A:
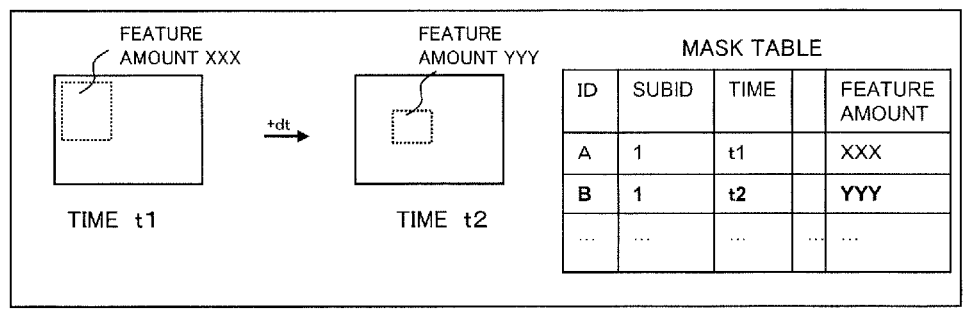
FIGS. 12A to 12B are diagrams illustrating examples of appending a mask scene as a mask object according to the embodiment.
Figure 12B:
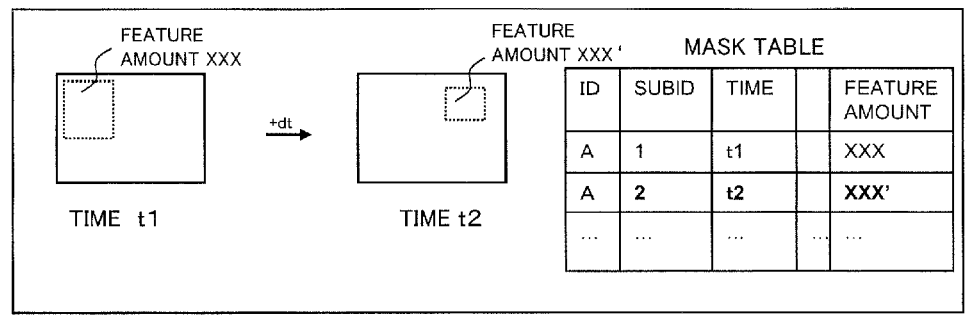

FIGS. 12A and 12B are diagrams illustrating examples of appending a mask scene as a mask object according to the embodiment. In the example of FIG. 12A, a mask scene of the feature amount YYY is extracted at the time t2. It is assumed that the feature amount YYY is completely different from the feature amount XXX. Therefore, a mask object having feature amount to be determined to be the same subject as the mask scene extracted at the time t2 is not present at the time t1 which corresponds to the time t2−dt). As a result, with the new ID (B) provided, the extracted mask scene is appended to the mask table 150 at the head of mask scene information of the new mask object.

Returning to FIG. 11, in step S1100, it is determined whether the mask table 150 includes a mask object which has feature amount to be determined to be the same subject as the mask scene being processed at the time (t−dt). When such a mask object is in the mask table 150, it is determined that the extracted mask scene is not an object having newly appeared (NO in S1100). That is, it is determined that the extracted mask scene is the mask scene of the object having already appeared, then with the ID of the already registered mask object being taken over, and the new SUBID, time, the center coordinates, the width, the height, and the feature amount are appended to the mask table 150 as information about that mask scene (S1102).

In the example of FIG. 12B, a mask scene of the feature amount XXX' is extracted at the time t2. In the example, a mask object A which has feature amount to be determined to be the same subject as the mask scene extracted at the time t2 is already present at the time t1 which corresponds to the time t−dt. Therefore, the already registered ID (A) is taken over and appended to the mask table.

As described above, the image editing apparatus 10 analyzes the video stream to generate aggregation having the mask scene appended, that is, the mask object, and registers it to the mask table 150.

1-4. Special Effect Processing

Figure 13:
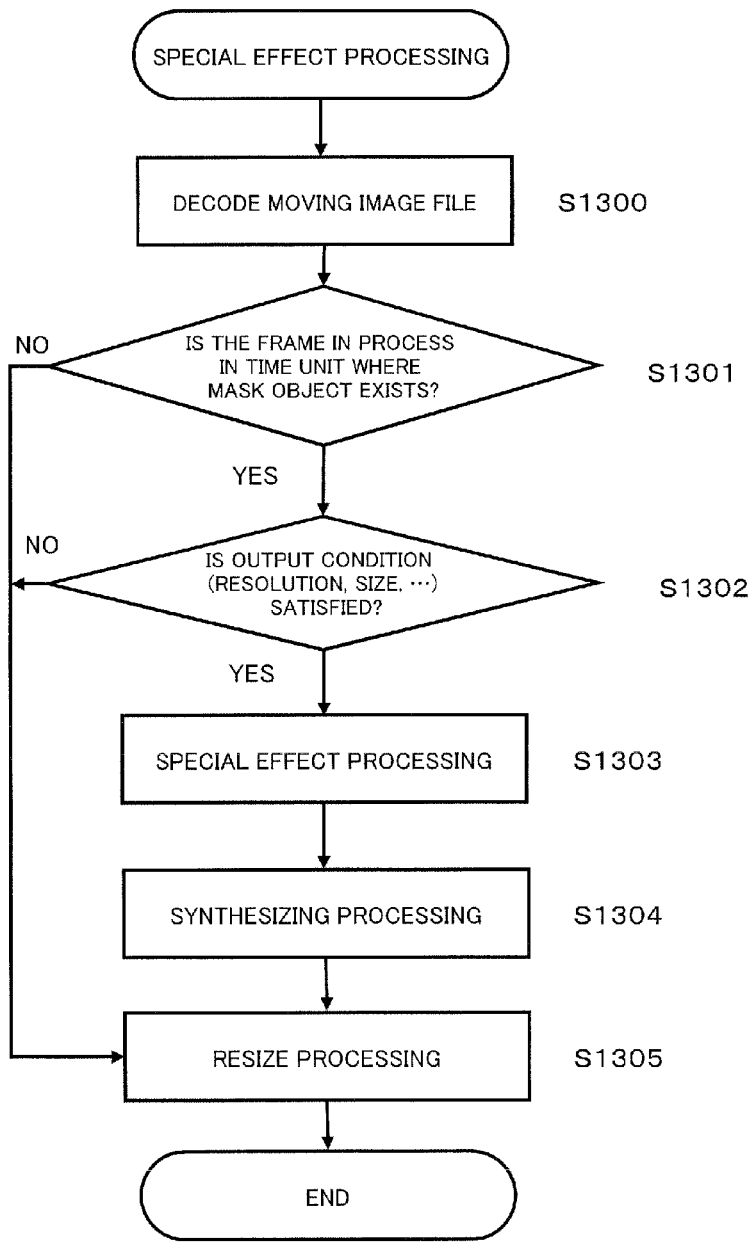
FIG. 13 is a flow chart describing synthesizing processing of a special effect according to the embodiment.

The special effect processing which is performed in response to pressing of the preview button 606 and the file output button 610 on the preview screen 600 illustrated in FIG. 7 will be described with reference to the flow chart of FIG. 13.

First, the conversion processing unit 120 of the CPU 101 decodes the moving image file with the demultiplexer 201 and the video decoder 202 of FIG. 2 (S1300).

Next, the conversion processing unit 120 of the CPU 101 determines whether the decoded video image contains a target to which the special effect processing is applied or not by the output condition determiner 208 according to the output region defined by the output condition 502.

Specifically, first, the CPU 101 determines whether a frame to be processed is within the time unit (time range) which includes the mask object, with reference to the mask table 150 (S1301). For example, referring to the mask table 150 shown in FIG. 8A, the period between the time t1 and t5 may be recognized as the time unit (time range) which includes the mask object related to the mask scene A.

When the frame to be processed is within the time unit (time range) which does not include the mask object (NO in S1301), the CPU 101 shifts the control step to step S1305.

On the other hand, when the frame to be processed is within the time unit (time range) which includes the mask object (YES in S1301), the CPU 101 analyzes the information units (the center coordinates, the width, the height, the feature amount) indicated by the all mask scenes described in the mask object and determines whether at least one information unit satisfies the output conditions (502) (S1302). When it is determined that no information unit satisfies the output condition, the CPU 101 shifts the control step to step S1305. On the other hand, when it is determined that the output conditions are satisfied by at least one information unit, the CPU 101 shifts the control step to step S1303.

Now, determination of the output condition (502) will be described. The determination criterion used for determining whether the output condition (502) is satisfied or not will be shown below. Each of the determination criteria from the Determination 1 to the Determination 3 may be used alone or optionally combined (for example, the Determination 1 and the Determination 3 are combined) for determination. For example, it may be determined that the output condition (502) is satisfied when the all determination criteria from the Determination 1 to the Determination 3 are satisfied. Alternatively, it may be determined that the output condition (502) is satisfied when at least one of the determination criteria is satisfied in an optional combination of the Determination 1 to the Determination 3.

<Determination Criteria>

Determination 1: $a \times V \geq a2$ or $b \times V \geq b2$ (at least either of the conditions of the width and the height is satisfied)

Determination 2: $a \times V \geq a2$ and $b \times V \geq B2$ (both of the conditions of the width and the height are satisfied)

Determination 3: $a \times b \times V \geq a2b2$ (the area is satisfied)

Here, V, a, b, a2, b2 are as below:

V: the scale ratio (resolution ratio) of the output moving image to the input moving image For example, when the width of the input moving image is 1920 pixels and the width of the output moving image is 480 pixels, the scale ratio $V = 480/1920 = 0.25$.

a: the width of the mask scene region of the determination target in the input image b: the height of the mask scene region of the determination target in the input image a2: the width defined as the output region (the threshold value for the width of the region to which the special effect is applied)

b2: the height defined as the output region (the threshold value for the height of the region to which the special effect is applied)

a2b2: the area defined as the output region (the threshold value for the area of the region to which the special effect is applied)

The above described determination criteria are criteria for determining whether the size of region of the mask scene of the determination target in the output moving image is not less than a predetermined value.

Figure 14:
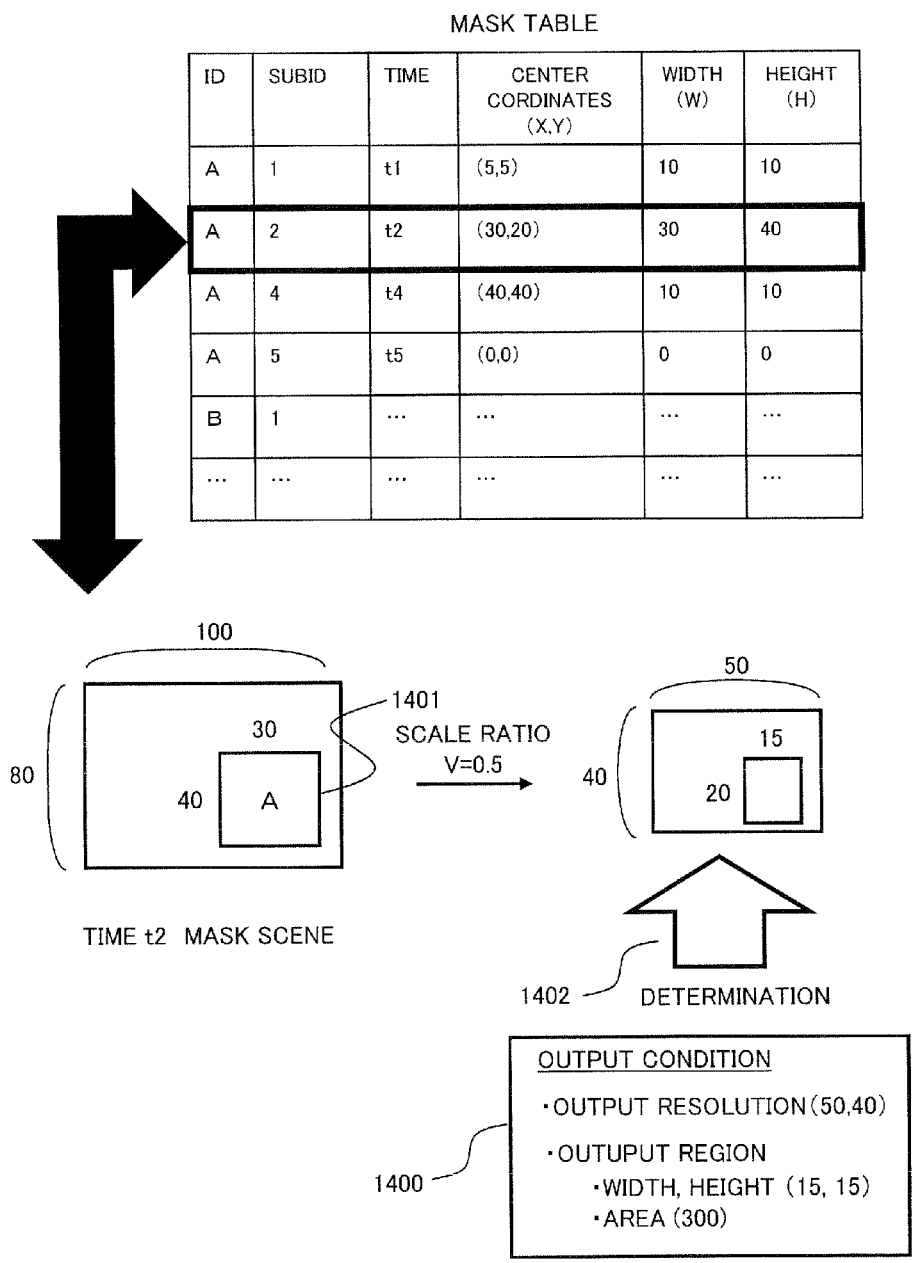
FIG. 14 is a diagram for describing determination processing based on a determination condition according to the embodiment.

The determination processing 1402 for determining the output conditions based on a combination of the Determination 1 and the Determination 3 will be described with reference to FIG. 14. FIG. 14 is a diagram for describing a case in which a currently processed mask object (A) which includes the time t is included in the mask table 150. The mask scene 1401 is a mask scene at the time t2 (=t1+dt) with the width 30 and the height 40. In the example shown in FIG. 14, since the width of the input moving image is 100 pixels and the width of the output moving image (the output moving image based on the output resolution) is 50 pixels, the scale ratio $V=0.5$. Further, as shown in the output condition 1400, the width and the height of the output region are 15 and 15, respectively, and the area is 300. Therefore, the respective variables become as follows.

a=30 (the width of the mask scene region of the determination target)
b=40 (the height of the mask scene region of the determination target)
a2=15 (the width defined as the output region)
b2=15 (the height defined as the output region)
a2b2=300 (the area defined as the output region)

When the determination processing 1402 is performed with a combination of the determination criteria of the Determination 1 and the Determination 3 under the above described conditions, both of the Determination 1 and the Determination 3 are established, therefore, the CPU 101 shifts the control step to step S1303.

Determination 1: 30×0.5≧15, therefore, the Determination 1 is established.

Determination 3: 30×40×0.5≧300, therefore, the Determination 3 is established.

Returning to FIG. 13, in step S1303, the processing specified by the special effect setting 503 such as "blurring", "mosaic processing", "synthesizing with another image" is performed on the subject region indicated by the currently processed mask scene, and the special effect video (video image subject to mask processing) is generated (S1303).

As described above, in the present embodiment, the special effect processing is performed only on the subject region of the mask scene registered in the mask table 150 which satisfies the output condition among the subject regions of the mask scenes registered in the mask table 150. More specifically, the special effect processing is applied only on the mask scene having a size in the output image (the resized image) which is larger than a predetermined size which is defined based on the output condition. Even though the above described processing has been performed, since a small region in the image is basically hard to be recognized by a viewer, omission of the special effect for the small region does not cause a problem in terms of protection of the privacy. In addition, since the special effect is applied to not all of the objects to be subject to the special effect, the region to be applied with the special effect in the image can be reduced. Therefore, degradation of the image quality can be suppressed.

Figure 15:
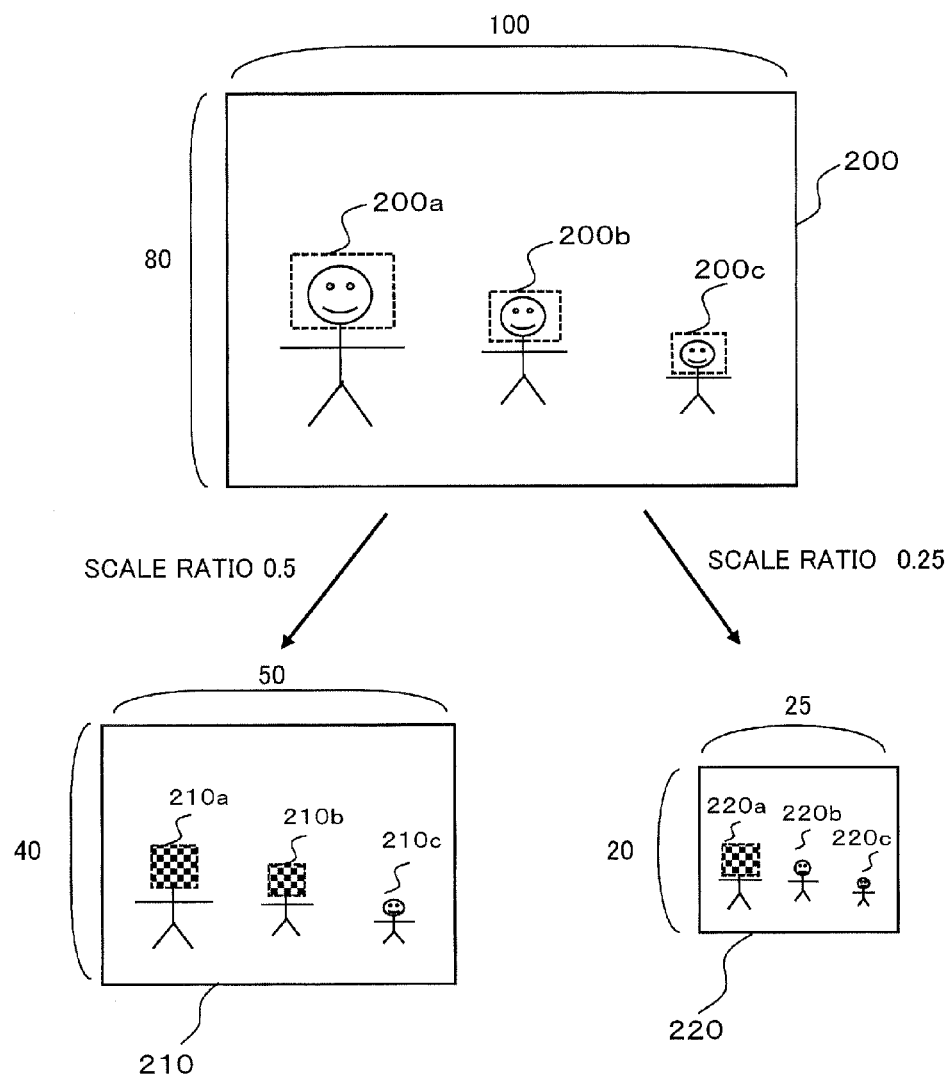
FIG. 15 is a diagram for describing a difference in applying a special effect to an output image, depending on a difference of output resolution of the output image.

FIG. 15 is a diagram describing a difference in applying a special effect caused by a difference of the output resolution. FIG. 15 illustrates an example of a case where the input moving image 200 is converted into two kinds of moving images 210 and 220 of different resolutions (sizes). The size of the input moving image 200 is 100 pixels×80 pixels. The size of one output moving image 210 is 50 pixels×40 pixels (scale ratio 0.5) and the size of the other output moving image 220 is 25 pixels×20 pixels (scale ratio 0.25). The input moving image 200 contains three mask scenes 200a, 200b, and 200c. In the output moving image 210 with the scale ratio of 0.5, the subject regions 210a and 210b among the subject regions indicated by the mask scenes 210a, 210b and 210c satisfy the output condition. As a result, the special effect processing is applied on the mask scenes 210a and 210b. On the other hand, since the mask scene 210c does not satisfy the output condition, the special effect processing is not applied on the mask scene 210c. In the output moving image 220 with the scale ratio of 0.25, only the subject region indicated by the mask scene 220a satisfies the output condition among the subject regions indicated by the mask scenes 220a, 220b, and 220c. As a result, the special effect processing is applied on the mask scene 220a. On the other hand, the mask scenes 220b and 220c do not satisfy the output condition, and thus the special effect processing is not applied on the mask scenes 220b and 220c. As described above, the special effect processing is not applied on a relatively small-sized subject in the output image even though the subject is a target object to be subject to the special effect.

Figure 16:
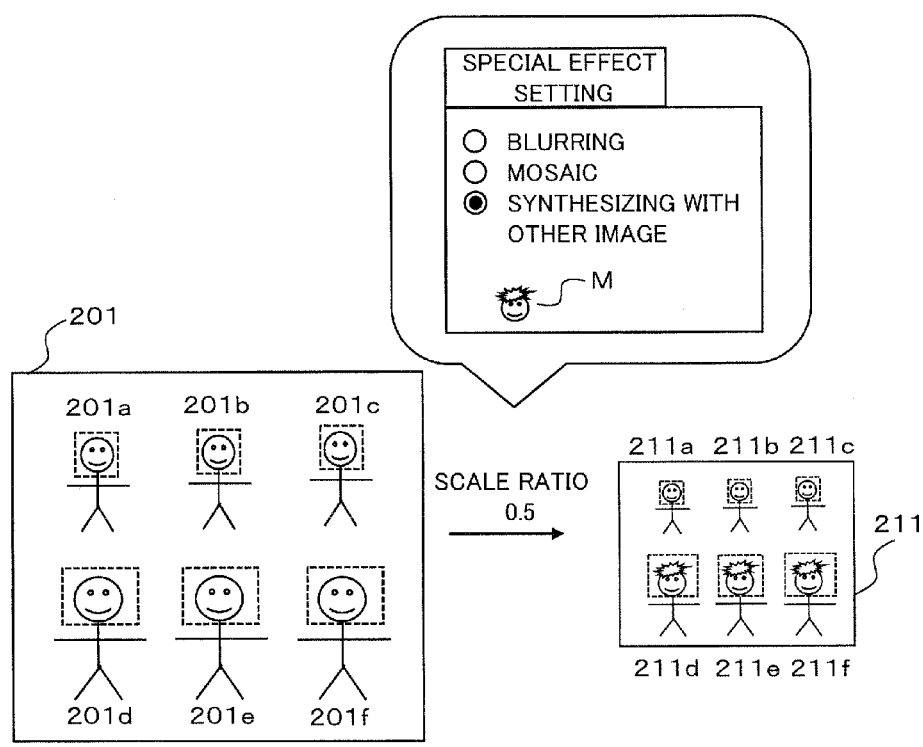
FIG. 16 is a diagram for describing a difference in applying a special effect to an output image, depending on a size of a subject in the output image.

FIG. 16 is a diagram describing state of applying a special effect in the output image in the case where "synthesizing with other image" is set as the special effect setting. In this example, the target object is replaced by another image M as the special effect. Since the subject regions indicated by the mask scenes 201a, 201b, and 201c do not satisfy the output condition in the input moving image 201, they are output as the mask scenes 211a, 211b, and 211c in the output moving image 211 with no image M synthesized (combined). On the other hand, the subject regions indicated by the mask scenes 201d, 201e, and 201f satisfy the output condition, and thus the image M specified in the special effect setting is synthesized (combined) with them, so that the mask scenes 211d, 211e, and 211f are output.

Next, the CPU 101 synthesizes the moving image decoded in step S1300 with the special effect video image (video image subject to mask processing) generated in step S1303 (S1304).

Next, the CPU 101 performs the resize processing on the frame in process according to the output resolution set in the output condition 502 (S1305). That is, when the frame indicated by the input moving image is synthesized with the special effect image (image subject to mask processing), the resize processing is performed on the synthesized image according to the output resolution of the output condition 502. On the other hand, when the frame indicated by the input moving image is not synthesized with the special effect image (image subject to mask processing), the resize processing is performed on the original frame indicating the input moving image according to the output resolutions of the output conditions 502.

As described above, the CPU 101 performs the minimum necessary amount of image processing on the output moving image file, and thus it can protect the privacy and the right of portrait of the output moving image file without degrading the original image quality and details. As a result, the user can easily exhibit his/her image to unspecified number of people on a network through blogs or the SNS.

As described above, the image editing apparatus 10 according to the present embodiment includes an input interface 11 (an example of an input unit) configured to input a moving image stream, and a CPU 101 (an example of an extracting unit) configured to extract a specific subject from at least one of frames composing the input moving image stream. The CPU 101 is also configured to perform a mask processing on the specific subject included in the frame of the input moving image stream. The CPU 101 determines whether or not to perform the mask processing to the specific subject according to a predetermined output condition which is defined based on at least an output resolution of the moving image stream to be output (step S1302 of FIG. 13). The CPU 101 performs the mask processing to the specific subject based on the determination result (step S1303 of FIG. 13).

Other Embodiments

As described above, the first embodiment has been discussed as an example of the technology disclosed in the present application. However, the technology in the present disclosure is not limited to the above embodiment and may also be applied to embodiments which are subject to modification, substitution, addition, or omission as required. Also, the respective constituent elements described in the first embodiment may be combined to form a new embodiment. Then, other embodiments will be exemplified below.

The above described embodiment has been discussed as an example of PC 100 functioning as an image editing apparatus in the present disclosure. However, the image editing apparatus is not limited to that, and may be implemented by any electronic equipment having a processor which can execute a program for achieving the above described processing. The program for achieving the above described processing may be recorded on a computer readable recording medium such as a CD-ROM, a DVD-ROM, and a semiconductor memory or may be distributed over a communication network. Further, by using a server installed to a data center or the like, for example, to execute the program, it is possible to provide services equivalent to the above described functions to users at remote locations in the form of so-called cloud computing.

In the above described embodiment, the mask scene is appended to the mask table 150 only when the append determination criterion is satisfied. In that case, it may be configured to change the reference value (threshold value) for determination in the append determination criterion according to the scale ratio V (resolution ratio) of the output moving image to the input moving image. For example, it may be configured to have the reference value for determination=predetermined value×V.

In the above described embodiment, when the output condition is satisfied at a certain time point within a time unit which includes mask objects, the special effect is applied to the target object appearing throughout the time unit. However, applying of the special effect to the target object which has been applied with the special effect may be stopped, when the output condition gets to be not satisfied as time passes.

As described above, the embodiment has been discussed as an example of the technology in the present disclosure. For those purposes, the accompanying drawings and the detailed description have been provided.

Therefore, the constituent elements shown or described in the accompanying drawings and the detailed description may include not only the constituent elements necessary to solve the problem but also the constituent elements unnecessary to solve the problem for the purpose of exemplifying the above described technology. Accordingly, it should not be instantly understood that these unnecessary constituent elements are necessary even though these unnecessary constituent elements are shown or described in the accompanying drawings and the detailed description.

Since the above described embodiments are for exemplifying the technology in the present disclosure, the embodiments may be subject to various kinds of modification, substitution, addition, omission, or the like without departing from the scope of the claims and their equivalents.

INDUSTRIAL APPLICABILITY

The present disclosure relates to electronic equipment and particularly to electronic equipment which can perform editing operation on an image. The present disclosure is not limited to be applied to a PC and may be applied to any electronic equipment such as cellular phones and video cameras as far as the equipment can perform the editing operation on an image. Also, the present disclosure may be applied to recording media such as CD and DVD storing a program which can execute the similar functions.

What is claimed is:

1. An image editing apparatus comprising:
   an input interface configured to input a moving image stream that includes a plurality of frames;
   a conversion processor configured to extract a specific subject from at least one of the frames included in the input moving image stream; and
   an image processor configured to perform a mask processing to the specific subject for producing an output moving image stream according to whether the specific subject satisfies a predetermined output condition;
   wherein a display resolution of the output moving image stream is different than a display resolution of the input moving image stream; and
   wherein the predetermined output condition is satisfied when at least one of the following determination criteria is satisfied:
   Determination 1: $a \times V \geq a2$ or $b \times V \geq b2$;
   Determination 2: $a \times V \geq a2$ and $b \times V \geq b2$;
   Determination 3: $a \times b \times V \geq a2 b2$;
   V, a, b, a2, b2 being defined as follows:
   V: a scale ratio of the display resolution of the output moving image to the display resolution of the input moving image;
   a: a width of a mask scene region of the specific subject in the input moving image;
   b: a height of the mask scene region of the specific subject in the input moving image;
   a2: a width of an output region of the specific subject in the output moving image; and
   b2: a height of the output region of the specific subject in the output moving image.

2. The image editing apparatus according to claim 1, wherein when the specific subject does not satisfy the predetermined output condition, the image processor determines that the mask processing is not to be performed on the specific subject.

3. The image editing apparatus according to claim 1, wherein the conversion processor extracts the specific subject at predetermined sampling intervals, and registers information about the extracted specific subject to a predetermined table as the extraction result, and
   by referring to the predetermined table, the image processor performs the mask processing on the specific subject according to whether the specific subject satisfies the predetermined output condition.

4. The image editing apparatus according to claim 3, wherein
   when extracting a subject which has a same feature amount at consecutive sampling intervals, the conversion processor recognizes the subject which has the same feature amount as the specific subject, and
   the conversion processor registers information about the extracted subject as the specific subject to the predetermined table, only when at least one of an amount of movement and a variation in size of the recognized specific subject has changed by a predetermined amount or more.

5. The image editing apparatus according to claim 1, wherein the conversion processor extracts a subject including at least one of a person, a person's face, a vehicle, and a license plate of a vehicle, as the specific subject.

6. The image editing apparatus according to claim 1, wherein the mask processing is at least one of: blurring an image of the specific subject, applying mosaic on the image of the specific subject, and synthesizing a predetermined image with the image of the specific subject.

7. The image editing apparatus according to claim 1, wherein when determining that the mask processing is performed to the specific subject, the image processor performs the mask processing to the specific subject included in one frame to which it is determined to perform the mask processing and frames before and after the one frame among all frames composing the input moving image stream.

8. The image editing apparatus according to claim 1, wherein the display resolution of the output moving image stream and the display resolution of the input moving image stream are measured in pixel width×pixel height.

9. An image editing apparatus comprising:
- an input interface configured to receive a moving image stream that includes a plurality of frames;
- a conversion processor configured to identify a specific subject from at least one of the frames included in the input moving image stream; and
- an image processor configured to perform a mask processing to the specific subject according to whether the specific subject satisfies a predetermined output condition to produce an output moving image stream;
- wherein a display resolution of the output moving image stream is different than a display resolution of the input moving image stream; and
- wherein the predetermined output condition is satisfied when at least one of the following determination criteria is satisfied:

Determination 1: $a \times V \geq a2$ or $b \times V \geq b2$;
Determination 2: $a \times V \geq a2$ and $b \times V \geq b2$;
Determination 3: $a \times b \times V \geq a2 b2$;

V, a, b, a2, b2 being defined as follows:
- V: a scale ratio of the display resolution of the output moving image to the display resolution of the input moving image;
- a: a width of a mask scene region of the specific subject in the input moving image;
- b: a height of the mask scene region of the specific subject in the input moving image;
- a2: a width of an output region of the specific subject in the output moving image; and
- b2: a height of the output region of the specific subject in the output moving image.

10. The image editing apparatus according to claim 9, wherein the display resolution of the output moving image stream and the display resolution of the input moving image stream are measured in pixel width×pixel height.

\* \* \* \* \*